US008519976B2

(12) United States Patent
Feng et al.

(10) Patent No.: US 8,519,976 B2
(45) Date of Patent: Aug. 27, 2013

(54) DISPLAY DEVICE AND TOUCH PANEL

(75) Inventors: Chen Feng, Beijing (CN); Li Qian, Beijing (CN); Yu-Quan Wang, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 423 days.

(21) Appl. No.: 12/858,437

(22) Filed: Aug. 18, 2010

(65) Prior Publication Data

US 2011/0242046 A1    Oct. 6, 2011

(30) Foreign Application Priority Data

Apr. 2, 2010 (CN) .......................... 2010 1 0138282

(51) Int. Cl.
*G06F 3/045* (2006.01)
(52) U.S. Cl.
USPC ........... 345/174; 977/742; 345/173; 427/122; 313/503
(58) Field of Classification Search
USPC ....................................................... 345/174
See application file for complete search history.

(56) References Cited

U.S. PATENT DOCUMENTS

| 7,045,108 | B2 | 5/2006 | Jiang et al. | |
|---|---|---|---|---|
| 2008/0248235 | A1* | 10/2008 | Feng et al. | 428/113 |
| 2008/0299031 | A1* | 12/2008 | Liu et al. | 423/447.3 |
| 2009/0056854 | A1* | 3/2009 | Oh et al. | 156/60 |
| 2009/0153509 | A1* | 6/2009 | Jiang et al. | 345/173 |
| 2009/0153516 | A1* | 6/2009 | Liu et al. | 345/173 |
| 2009/0160795 | A1* | 6/2009 | Jiang et al. | 345/173 |
| 2009/0167708 | A1* | 7/2009 | Jiang et al. | 345/173 |
| 2009/0169819 | A1* | 7/2009 | Drzaic et al. | 428/156 |
| 2009/0289203 | A1* | 11/2009 | Jiang et al. | 250/492.1 |
| 2010/0270911 | A1* | 10/2010 | Liu et al. | 313/503 |
| 2011/0102361 | A1* | 5/2011 | Philipp | 345/174 |

FOREIGN PATENT DOCUMENTS

WO    WO2007015710    2/2007

* cited by examiner

*Primary Examiner* — Kent Chang
*Assistant Examiner* — Benjamin Morales Fernandez
(74) *Attorney, Agent, or Firm* — Altis Law Group, Inc.

(57) ABSTRACT

A display device includes a touch panel. The touch panel includes at least one transparent conductive layer. The at least one transparent conductive layer is a carbon nanotube layer including a plurality of carbon nanotubes, and the plurality of carbon nanotubes are substantially arranged along the same axis, and the density of the carbon nanotube layer is not constant.

3 Claims, 11 Drawing Sheets

DISPLAY DEVICE AND TOUCH PANEL

CROSS-REFERENCE TO RELATED APPLICATIONS

This application claims all benefits accruing under 35 U.S.C. §119 from China Patent Application No. 201010138282.3, filed on 2010 Apr. 2, in the China Intellectual Property Office, the disclosure of which is incorporated herein by reference.

BACKGROUND

1. Technical Field

The present invention relates to touch panels and, particularly, to a carbon nanotube based touch panel and a display device incorporating the same.

2. Description of Related Art

Following the advancement in recent years of various electronic apparatuses such as mobile phones, car navigation systems and the like toward high performance and diversification, there is continuous growth in the number of electronic apparatuses equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation.

At present, resistive, capacitive, infrared, and surface acoustic wave touch panels have been developed. Due to higher accuracy and low cost of production, resistive and capacitive touch panels have been most widely applied.

A resistive or capacitive touch panel often includes a layer of indium tin oxide (ITO) used as an optically transparent conductive layer. The ITO layer is generally formed by ion beam sputtering, a relatively complicated undertaking Furthermore, the ITO layer has poor wearability, low chemical endurance and uneven resistance over the entire area of the panel, as well as relatively low transparency. Such characteristics of the ITO layer can significantly impair sensitivity, accuracy, and brightness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
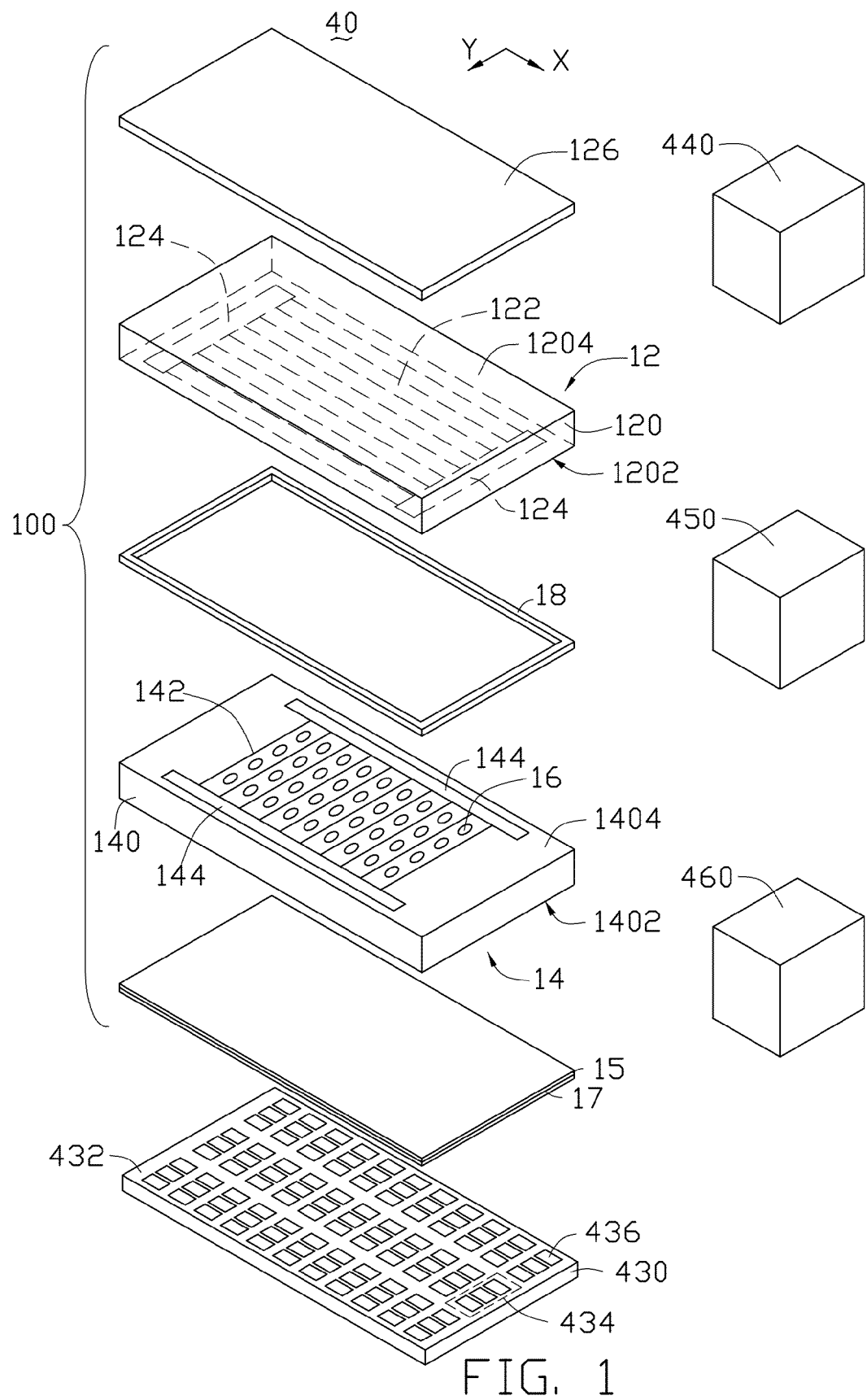
FIG. 1 is an exploded, isometric view of an embodiment of a display device.
Figure 2:
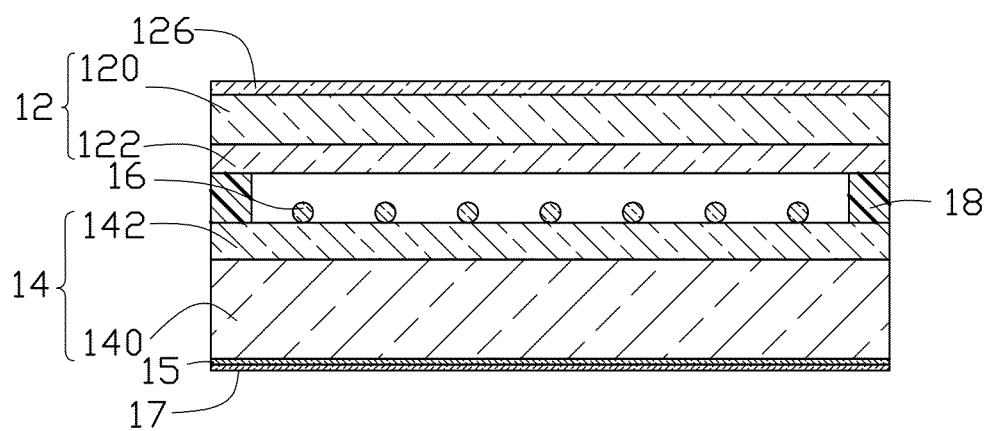
FIG. 2 is a transverse assembled cross-section of a touch panel of FIG. 1.

Referring to FIG. 1 and FIG. 2, one embodiment of a display device 40 comprises a touch panel 100, a display element 430, a touch panel controller 440, a central processing unit (CPU) 450, and a display element controller 460.

Basically, the touch panel 100 is opposite and adjacent to the display element 430. The touch panel 100 is connected to the touch panel controller 440 by a circuit external to the touch panel 100. The touch panel controller 440, the CPU 450 and the display element controller 460 are electrically connected. In particular, the CPU 450 is connected to the display element controller 460 to control the display element 430.

The display element 430 comprises a display surface 432 facing the touch panel 100. An array of pixels 434 is arranged in rows and columns along a first direction and a second direction on the display surface 432. The first direction is parallel to the X axis shown in FIG. 1. The second direction is parallel to the Y axis shown in FIG. 1.

Each of the pixels 434 comprises three sub-pixels 436 for red, green and blue light (e.g., R sub-pixel, G sub-pixel, B sub-pixel) corresponding to three display units. The R, B, G sub-pixels are regularly arranged along the second direction. The pixels 434 with the sub-pixels 436 are regularly and periodically arranged. The array of pixels 434 has a periodical iterative structure.

The display element 430 can be, for example, a conventional display such as a liquid crystal display, field emission display, plasma display, electroluminescent display, vacuum fluorescent display, cathode ray tube, or other display device, or a flexible display such as an e-paper (a microencapsulated electrophoretic display), a flexible liquid crystal display, a flexible organic light emitting display (OLED), or any other flexible display. In this embodiment, the display element 430 can be a liquid crystal display.

The touch panel 100 can be spaced from the display element 430 or installed directly on the display element 430. If the touch panel 100 is installed directly on the display element 430, the touch panel 100 can be attached on the display element 430 via adhesive. Electrical connections between the touch panel 100 and the display element 430 can be provided through built-in ports (not shown). The area of the touch panel 100 can be equal to the area of the display surface 432. It is to be understood that there may be a plurality of touch panels arranged on the display surface if the touch panel has a lower area than that of the display surface.

In one embodiment, the touch panel 100 is spaced from the display element 430 and has an area substantially equal to that of the display surface 432. The touch panel 100 is a resistive touch panel. The touch panel 100 comprises a first electrode plate 12, a second electrode plate 14, a shielding layer 15, a plurality of dot spacers 16, a passivation layer 17, an insulating frame 18 and a transparent protective film 126.

The first electrode plate 12 and the second electrode plate 14 are opposite to and spaced from each other. The dot spacers 16 and the insulating frame 18 are disposed between the first electrode plate 12 and the second electrode plate 14. The insulating frame 18 separates the first electrode plate 12 from the second electrode plate 14. The shielding layer 15 is located on a surface of the second electrode plate 14 separated from the insulating frame 18. The passivation layer 17 is located on a surface of the shielding layer 15 and the shielding layer 15 is located between the second electrode plate 14 and the passivation layer 17. The transparent protective film 126 is located on a surface of the first electrode plate 12, separated from the second electrode plate 14.

The first electrode plate 12 includes a first substrate 120, a first conductive layer 122, and two first electrodes 124. The first substrate 120 includes a first surface 1202 and an opposite second surface 1204, each of which is substantially flat. The first conductive layer 122 can be transparent. The first conductive layer 122 and the two first electrodes 124 are located on the first surface 1202 of the first substrate 120. The two first electrodes 124 are located separately on opposite ends of the first conductive layer 122. A direction from one of the first electrodes 124 across the first conductive layer 122 to the other of the two first electrodes 124 is defined as a third direction. The two first electrodes 124 electrically connect to the first conductive layer 122.

The second electrode plate 14 includes a second substrate 140, a second conductive layer 142, and two second electrodes 144. The second substrate 140 includes a first surface 1402 and an opposite second surface 1404, each of which is substantially flat. The first surface 1402 is away from the insulating frame 18. The second conductive layer 142 can be transparent. The second conductive layer 142 and the two second electrodes 144 are located on the second surface 1404 of the second substrate 140. The two second electrodes 144 are located separately on opposite ends of the second conductive layer 142. The two second electrodes 144 electrically connect to the second conductive layer 142. The second conductive layer 142 and the two second electrodes 144 are opposite to and spaced from the first conductive layer 122 and the two first electrodes 124. The distance between the second conductive layer 142 and the first conductive layer 122 can range from about 2 microns to about 10 microns.

A direction from one of the second electrodes 144 across the second conductive layer 142 to the other of the two second electrodes 144 is defined as the fourth direction. The third direction can cross the fourth direction. In one embodiment, the third direction is parallel to the X axis shown in FIG. 1, and the fourth direction is parallel to the Y axis shown in FIG. 1. The X axis is perpendicular to the Y axis. The two first electrodes 124 are orthogonal to the two second electrodes 144. The two first electrodes 124 are aligned parallel to the Y axis, and the two second-electrodes 144 are aligned parallel to the X axis.

The first substrate 120 is a transparent and flexible film/plate made of polymer, resin, or any other flexible material. The second substrate 140 is a transparent board made of glass, diamond, quartz, plastic or any other suitable material. The second substrate 140 can be made of flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins.

In one embodiment, the first substrate 120 and the second substrate 140 each can be made of PET, and the thickness thereof can be about 2 millimeters. It is noted that, the electrodes of the flexible touch panel should be tough but flexible. In one embodiment, the first electrodes 124 and the second electrodes 144 can be made of conductive silver paste.

At least one of the first conductive layer 122 and the second conductive layer 142 can be or can comprise a carbon nanotube layer. If one of the first conductive layer 122 and the second conductive layer 142 is a carbon nanotube layer, the other of them can be an indium tin oxides (ITO) layer or an antimony tin oxide (ATO) layer.

A carbon nanotube layer is formed of a plurality of carbon nanotubes, and the carbon nanotubes in the carbon nanotube layer are arranged along the same axis, i.e., collinear and/or parallel. The carbon nanotube layer can be a transparent carbon nanotube film or a plurality of transparent carbon nanotube films contiguously disposed side by side. The thickness of the carbon nanotube film is not limited, and in one embodiment ranges from about 0.5 nm to about 100 μm. In one embodiment, the thickness of the carbon nanotube film ranges from about 100 nm to about 200 nm.

The carbon nanotube film can be a freestanding structure, and includes a plurality of carbon nanotubes. The term "freestanding structure" includes, but is not limited to, a structure that does not have to be supported by a substrate. For example, a freestanding structure can sustain its weight when hoisted by a portion thereof without any significant damage to its structural integrity.

Figure 3:
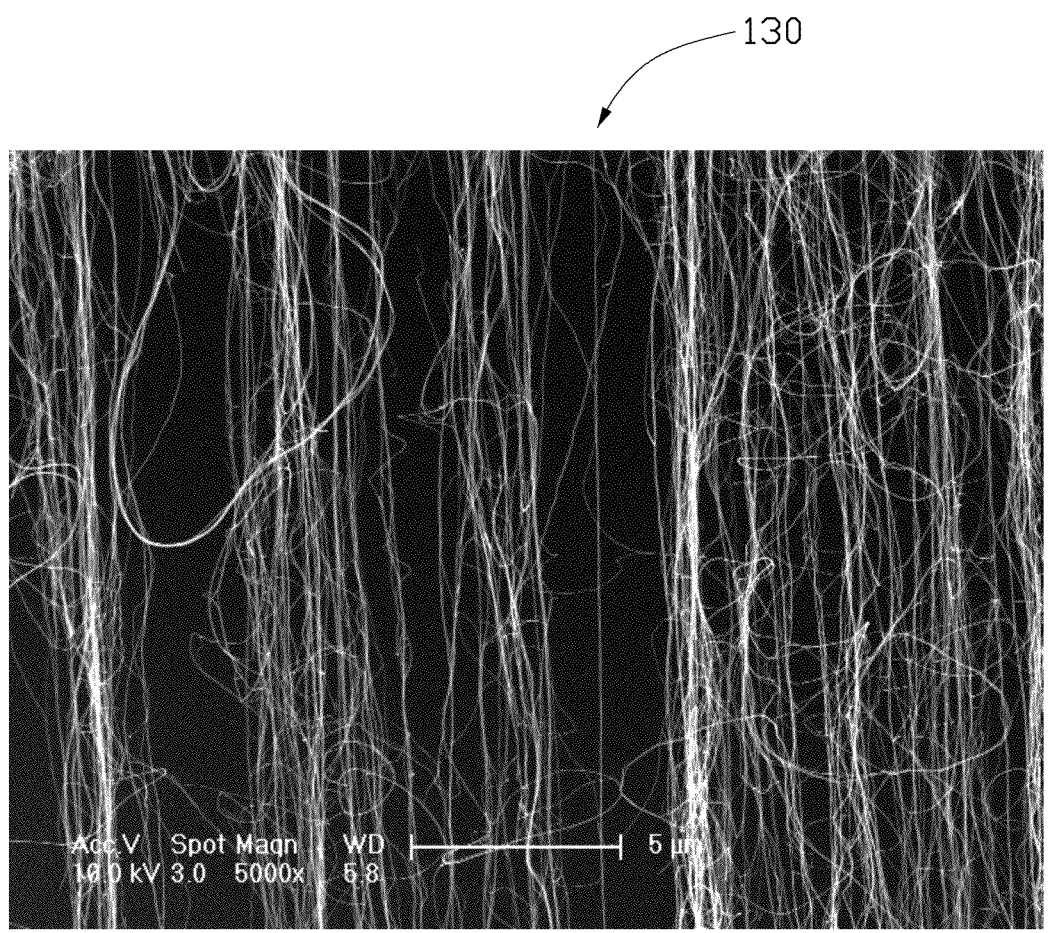
FIG. 3 shows a Scanning Electron Microscope (SEM) image of a carbon nanotube layer.
Figure 4:
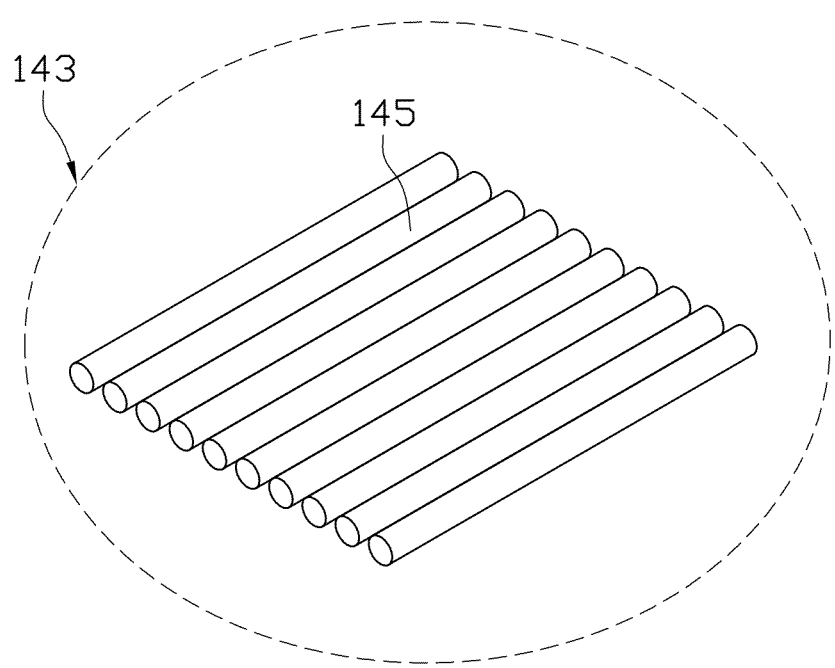
FIG. 4 is a schematic, enlarged view of a carbon nanotube segment.

Referring to FIGS. 3 and 4, a carbon nanotube film comprises a plurality of successively oriented carbon nanotube segments 143 joined end-to-end by Van der Waals attractive force. Each carbon nanotube segment 143 includes a plurality of carbon nanotubes 145 parallel to each other, and combined by Van der Waals attractive force. The carbon nanotube segments 143 can vary in width, thickness, uniformity and shape. The carbon nanotubes 145 in the carbon nanotube segments 143 are also oriented along a preferred orientation. Examples of a drawn carbon nanotube film are taught by U.S. Pat. No. 7,045,108 to Jiang et al., and WO 2007015710 to Zhang et al. The carbon nanotube film has good flexibility and can be bent according to the actual application. This can make the touch panel 100 adopting the carbon nanotube film has good flexibility.

Further, the carbon nanotube layer comprises a plurality of thin regions and a plurality of normal regions around the thin regions. Each of the thin regions corresponds to one sub-pixel 436 of one pixel 434. The thin regions can be formed by irradiating the carbon nanotube layer with a laser. Each of the thin regions has a density lower than that of the normal regions.

The ratio of the density of the normal regions to the density of the thin regions exceeds 2:1. In one embodiment, the ratio of the density of the normal regions to the density of the thin regions exceeds 4:1. The densities of the thin regions are not periodically arranged. Thus, the carbon nanotube layer is a non-periodical or non-iterative structure. The densities of the thin regions can be formed by controlling the laser energy density. In one embodiment, densities of adjacent thin regions are different.

As described, the pixels 434 with the sub-pixels 436 are regularly and periodically arranged, and the carbon nanotube layer is a non-periodical or non-iterative structure. If the carbon nanotube layer is disposed on the display surface 432 with the pixels 434 disposed thereon, undesired moire patterns can be eliminated or reduced. This is because the carbon nanotube layer has non-regular patterns due to the presence of the thin regions.

In one embodiment, the first conductive layer 122 and the second conductive layer 142 both comprise a carbon nanotube layer formed by a single carbon nanotube film 130.

Carbon nanotubes in the carbon nanotube film 130 of the first electrode plate 12 are oriented along a preferred orientation, such as the X axis shown in FIG. 1. The two first electrodes 124 are disposed at opposite ends of the carbon nanotube film 130 of the first electrode plate 12. The carbon nanotubes in the carbon nanotube film 130 of the first electrode plate 12 are oriented along an axis from one of the first electrodes 124 to the other of the first electrodes 124.

Carbon nanotubes in the carbon nanotube film 130 of the second electrode plate 14 are oriented along a preferred orientation, such as the Y axis shown in FIG. 1. The two second electrodes 144 are disposed at opposite ends of the carbon nanotube film 130 of the second electrode plate 14. The carbon nanotubes in the carbon nanotube film 130 of the second electrode plate 14 are also oriented along an axis from one of the second electrodes 144 to the other of the second-electrodes 144.

The carbon nanotube films 130 of the first electrode plate 12 and the second electrode plate 14 each have a length of about 30 cm, a width of about 15 cm and a thickness of about 50 nm. The light transmittance of the carbon nanotube films 130 exceeds 95%.

Figure 5:
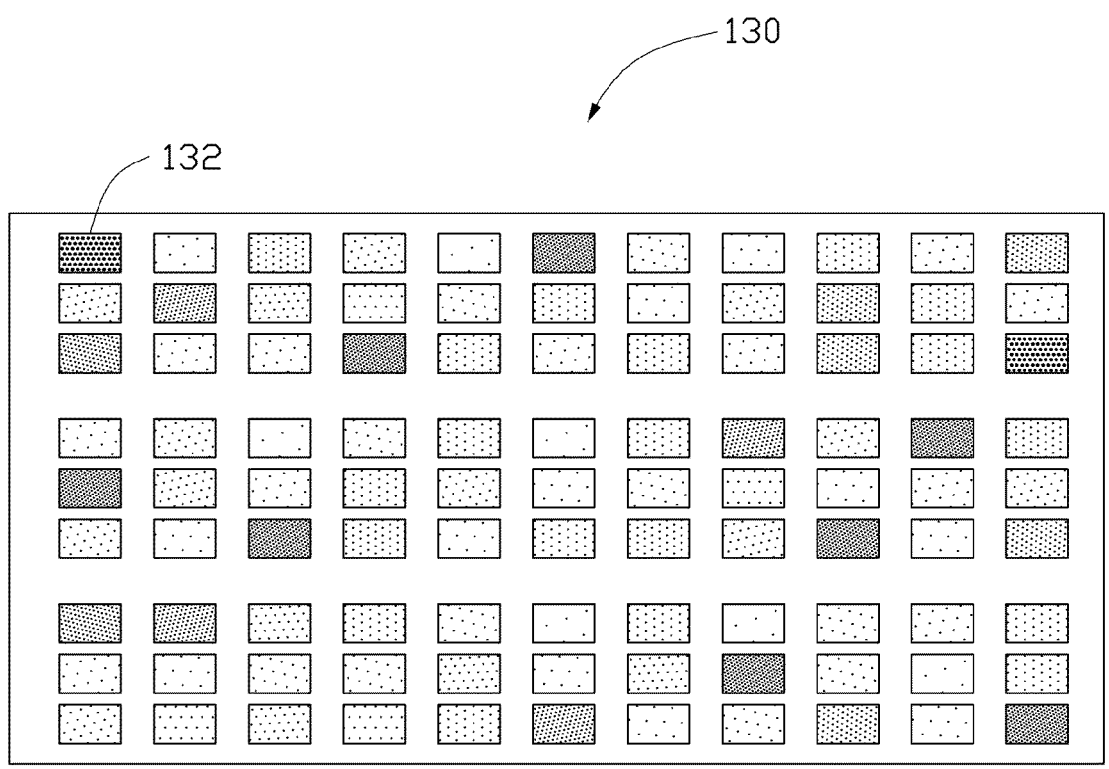
FIG. 5 is a schematic view of a carbon nanotube layer used in the touch panel of FIG. 2.

Referring to FIG. 5, each of the carbon nanotube films 130 comprises a plurality of thin regions 132. The thin regions 132 are arranged in an array. The thin regions 132 correspond to the sub-pixels 436 in a one-to-one manner. Every adjacent two thin regions 132 have different densities. The ratio between the densities of every adjacent two thin regions 132 equals or exceeds 2:1.

The thin regions 132 of same density are non-periodically or irregularly arranged in the carbon nanotube film 130. The entire densities of the carbon nanotube layer are non-periodically or irregularly arranged. If the carbon nanotube layer is disposed on the display surface 432, moire patterns can be eliminated or reduced; thus, the resolution and the display quality of the display device 40 can be greatly improved.

The first electrodes 124 and the second electrodes 144 can be made of electrically conductive materials, such as metal, carbon nanotubes. In one embodiment, the first electrode 124 and the second electrode 144 are made of silver. It is noted that, electrodes of a flexible touch panel should be tough but flexible, and the electrodes can be made of carbon nanotubes, conductive polymer or the like.

The dot spacers 16 and the insulating frame 18 are disposed between the first electrode plate 12 and the second electrode plate 14. The dot spacers 16 are separately located on the second conductive layer 142. The insulating frame 18 separates the first electrode plate 12 from the second electrode plate 14. A distance between the second electrode plate 14 and the first electrode plate 12 is in an approximate range from 2 to 20 microns.

The insulating frame 18 and the dot spacers 16 are made of, for example, insulating resin or any other suitable insulating material. Insulation between the first electrode plate 12 and the second electrode plate 14 is provided by the insulating frame 18 and the dot spacers 16. It is to be understood that the dot spacers 16 are optional, particularly when the touch panel 100 is relatively small. They serve as supports given the size of the span and the strength of the first electrode plate 12.

The shielding layer 15 is disposed on the first surface 1402 of the second substrate 140. The material of the shielding layer 15 can be ITO film, ATO film, conductive resin film, carbon nanotube film, or another suitable conductive film. In one embodiment, the shielding layer 15 is a carbon nanotube film. The carbon nanotube film includes a plurality of carbon nanotubes, orientations of the carbon nanotubes therein can be arbitrarily determined. In this embodiment, the carbon nanotubes in the carbon nanotube film of the shielding layer 15 are arranged along the same axis. The carbon nanotube film is connected to ground and acts as shielding, thus enabling the touch panel 100 to operate without interference (for example, electromagnetic interference).

The passivation layer 17 can be spaced from the display element 430 a certain distance or can be installed on the display element 430. The passivation layer 17 can protect the display element 430 from chemical or mechanical damage.

The transparent protective film 126 is disposed on the second surface 1204 of the first substrate 120. The material of the transparent protective film 126 can be silicon nitride, silicon dioxide, BCB, polyester, acrylic resin, PET, or any combination thereof. The transparent protective film 126 can also be a plastic film and receives a surface hardening treatment to protect the first electrode plate 12 from being scratched when in use. The transparent protective film 126 can also provide additional functions such as reducing glare, reflection or other. In the present embodiment, the material of the transparent protective film 126 is PET.

It is to be understood that the shielding layer 15, the passivation layer 17 and the transparent protective film 126 are optional. It is also to be understood that the two first electrodes 124 can be disposed on the second electrode plate 14 rather than the first electrode plate 12. The two first electrodes 124 can be located separately on opposite ends of the second conductive layer 142 along the third direction. The two second electrodes 144 can be located separately on opposite ends of the second conductive layer 142 along the fourth direction. The two first electrodes 124 and the two second electrodes 144 are electrically connected to the second conductive layer 142, respectively.

Figure 6:
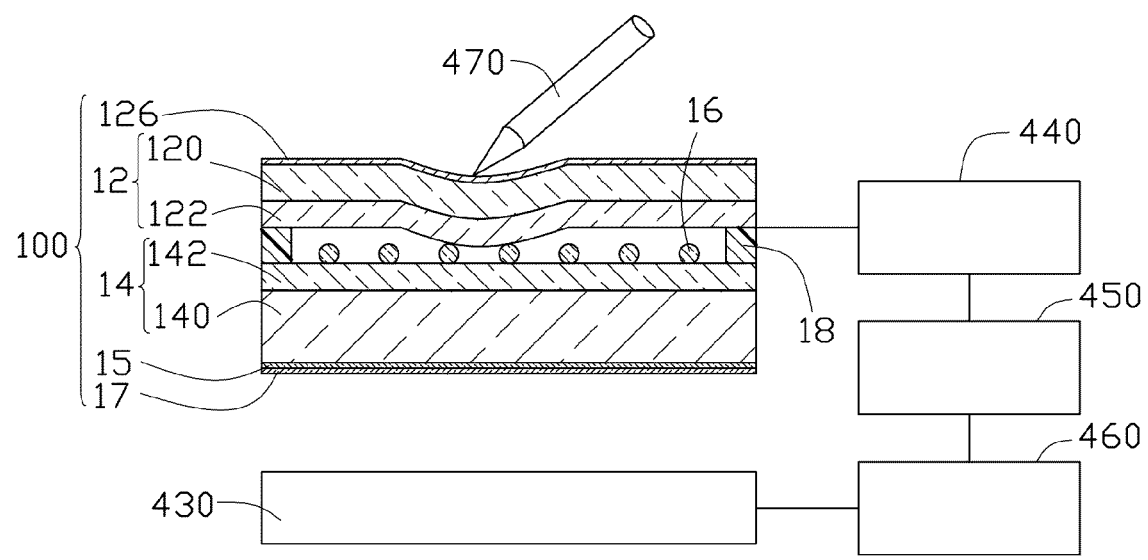
FIG. 6 shows an operating stage of the display device of FIG. 1 with a contact tool.

Referring to FIG. 6, in operation of the display device 40, a voltage is applied to the first electrode plate 12 and the second electrode plate 14, respectively. Contact is made with the first electrode plate 12 corresponding to elements appearing on the display element 430 by a tool 470 such as a finger, pen, or the like. The resulting deformation of the first electrode plate 12 causes a connection between the first conductive layer 122 and the second conduction layer 142. Changes in voltages in the X axis of the first conductive layer 122 and the Y axis of the second conductive layer 142 are detected by the touch panel controller 440 and sent to the CPU 450 to calculate position of the deformation. The display element 430 shows desired information under control of the display element controller 460 and the CPU 450.

Figure 7:
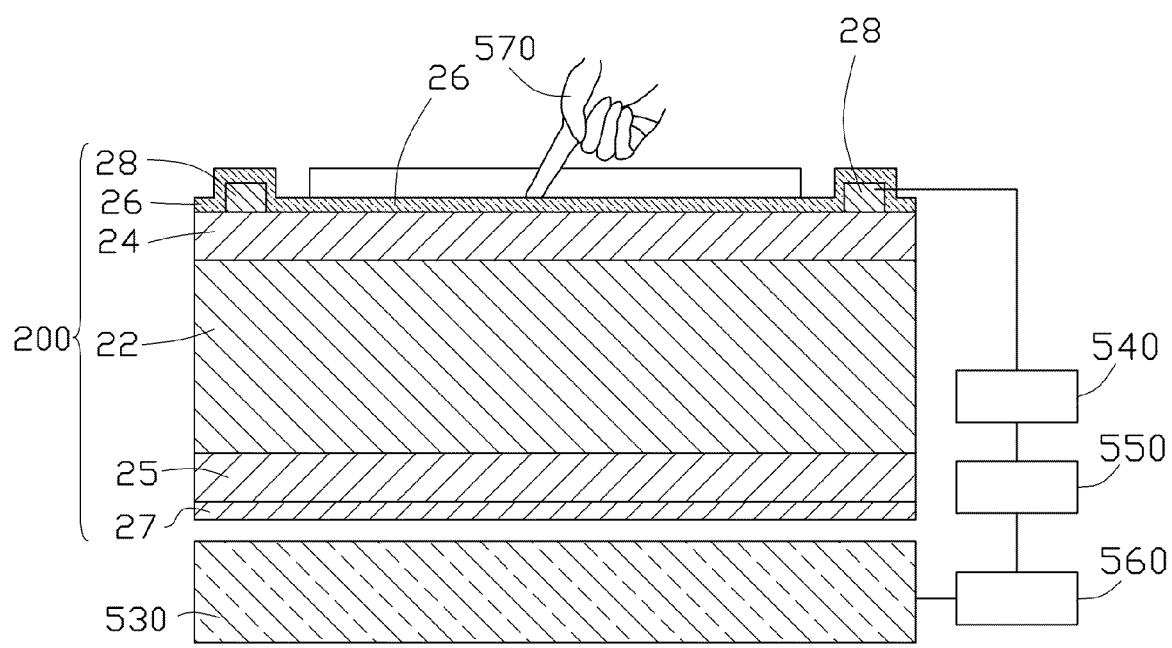
FIG. 7 is a schematic cross-section of another embodiment of a display device, showing operation of the display device.

Referring to FIG. 7, one embodiment of a display device 50 is provided. The display device 50 comprises a touch panel 200, a display element 530, a touch panel controller 540, a CPU 550, and a display element controller 560.

Figure 8:
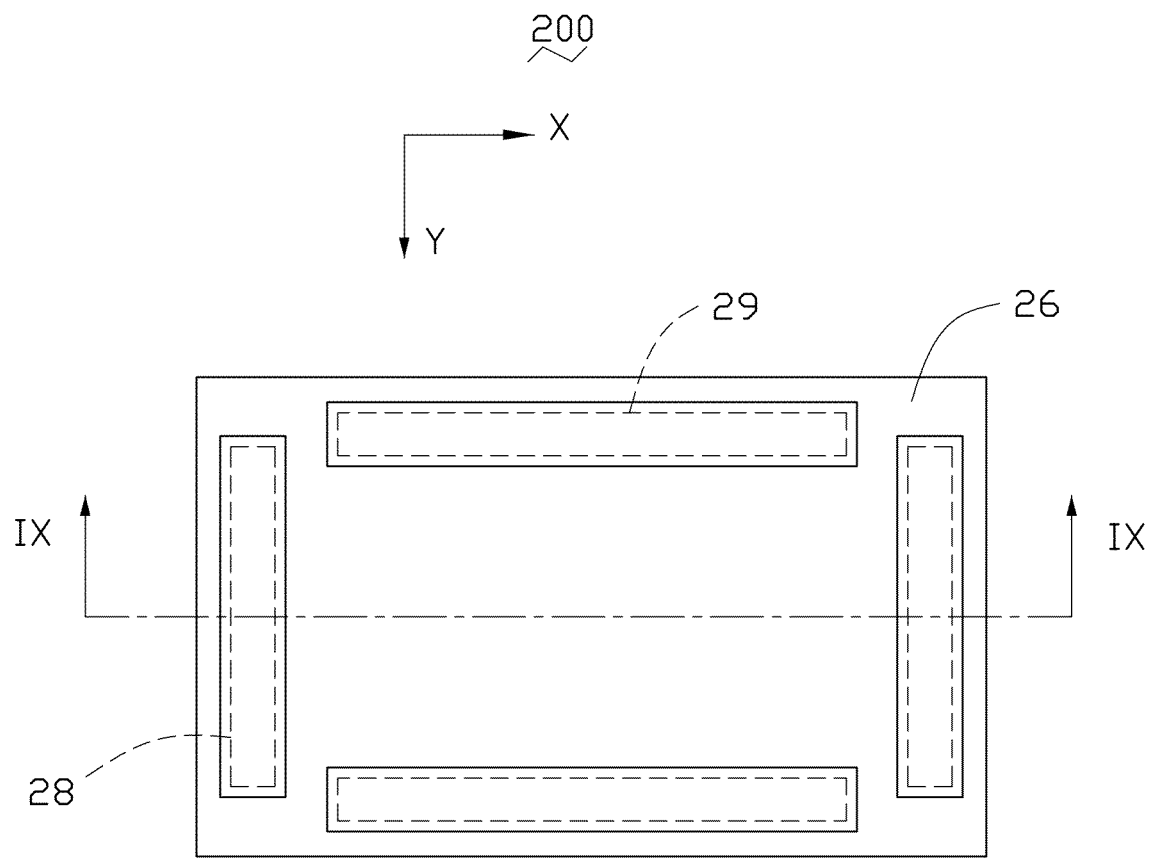
FIG. 8 is a top view of a touch panel of FIG. 7.
Figure 9:
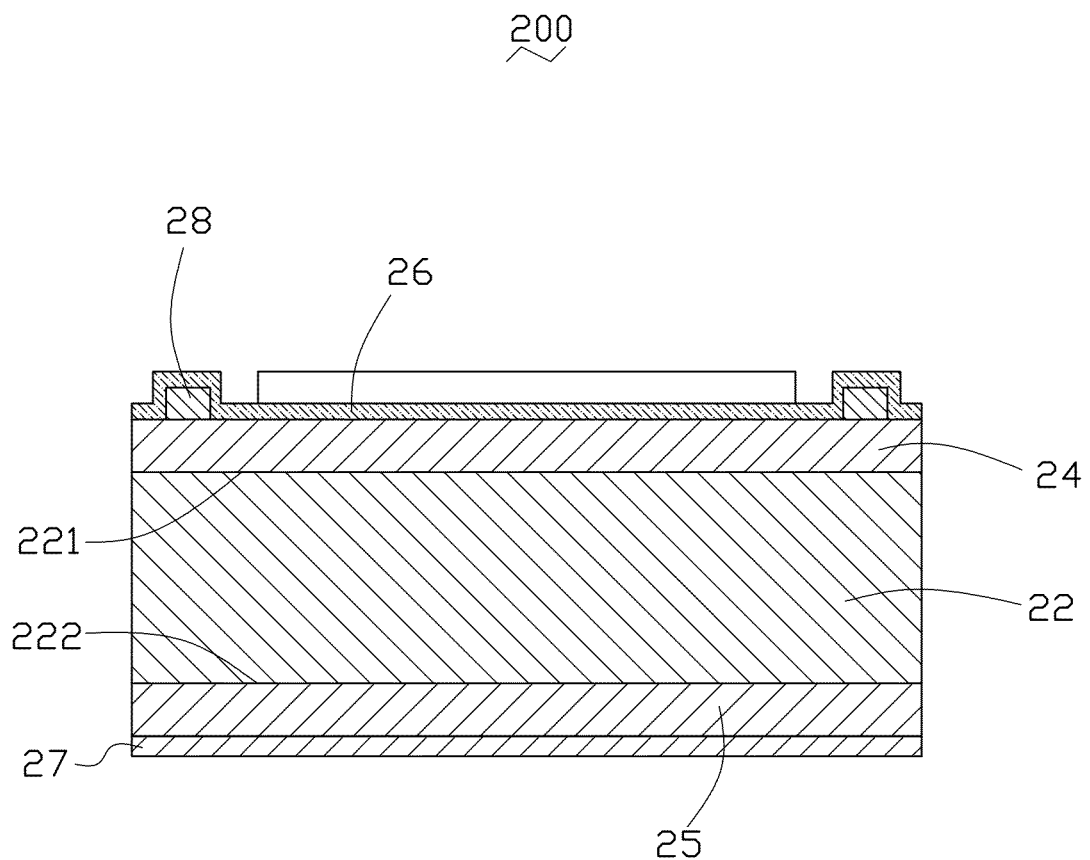
FIG. 9 is a cross-section along line IX-IX of FIG. 8.
Figure 10:
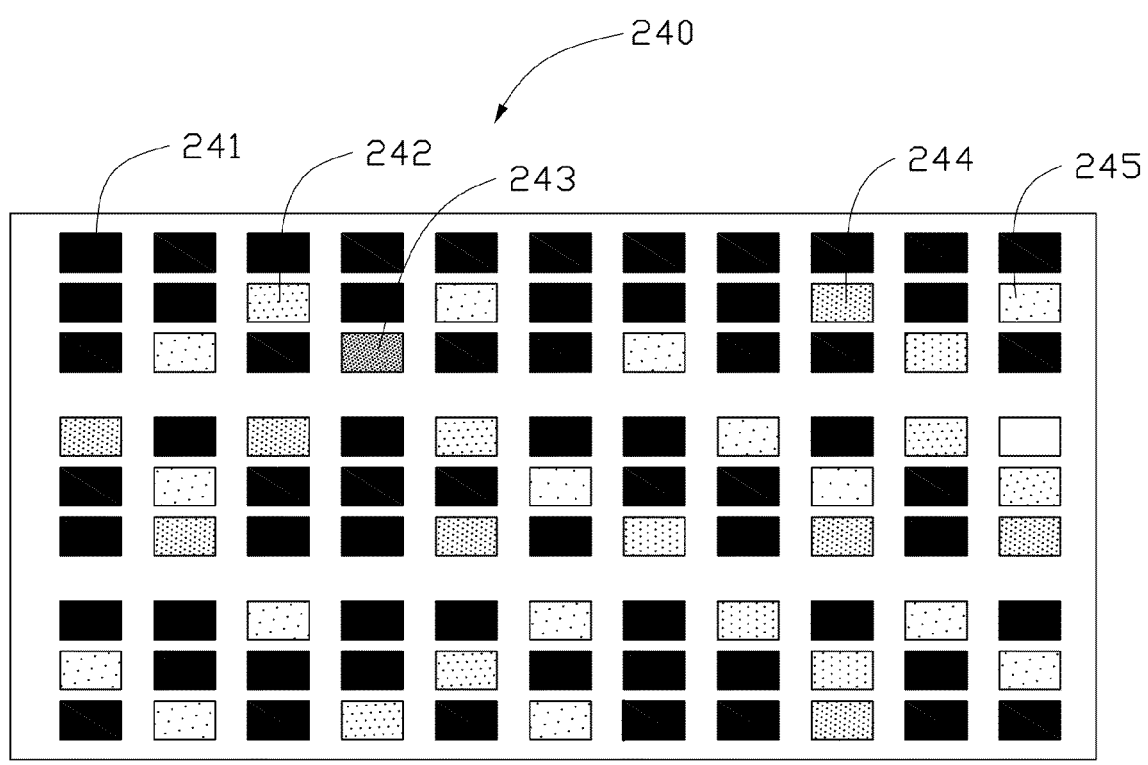
FIG. 10 is a schematic view of a carbon nanotube layer used in the touch panel of FIG. 9.

The touch panel 200 is a capacitive touch panel. Referring to FIG. 8 and FIG. 9, the touch panel 200 comprises a substrate 22, a transparent conductive layer 24, a shielding layer 25, a transparent protective film 26, a passivation layer 27, two first electrodes 28 and two second electrodes 29.

The substrate 22 comprises a first surface 221 and an opposite second surface 222. The transparent conductive layer 24 is disposed on the first surface 221. The two first electrodes 28 and two second electrodes 29 are spacedly disposed and electrically connected to the transparent conductive layer 24 to form an equipotential plane on the transparent conductive layer 24. The shielding layer 25 is disposed on the second surface 222. The transparent protective film 26 can be directly disposed on the transparent conductive layer 24, the two first electrodes 28 and two second electrodes 29. The passivation layer 27 is disposed on a surface of the shielding layer 25 and faces the display element 530. The shielding layer 25 is located between the substrate 22 and the passivation layer 27.

The substrate 22 can be a curved structure or a planar structure. The substrate 22 can be made of rigid materials such as glass, quartz, diamond or plastic. The substrate 22 can also be made of flexible materials the same as that of the first substrate 120. In this embodiment, the substrate 22 is a planar structure and made of PC.

The transparent conductive layer 24 is a carbon nanotube layer. The carbon nanotube layer is similar to the carbon nanotube layers of the first conductive layer 122 and the second conductive layer 142, except that the carbon nanotube layer is a carbon nanotube film 240 which comprises a plurality of groups of thin regions 241, 242, 243, 244, 245. In each of the groups of thin regions 241, 242, 243, 244, 245, the thin regions have the same density. In each of the groups of thin regions 241, 242, 243, 244, 245, the thin regions are non-periodically or irregularly arranged in the carbon nanotube film 240. Thus, the entire densities of the carbon nanotube film 240 are non-periodically or irregularly arranged. If the carbon nanotube film 240 is disposed on the display element 530, moire patterns can be eliminated or reduced; thus, the resolution and the display quality of the display device 50 can be greatly improved.

The two first electrodes 28 can be located separately on opposite ends of the transparent conductive layer 24 or the substrate 22 along the X axis shown in FIG. 8. The two second electrodes 29 can be located separately on opposite ends of the transparent conductive layer 24 or the substrate 22 along the Y axis as shown in FIG. 8. The two first electrodes 28 and the second electrodes 29 can be disposed on the transparent conductive layer 24 or the substrate 22, so long as the first electrodes 28 and the second electrodes 29 are electrically connected to the transparent conductive layer 24.

The first electrodes 28 and the second electrodes 29 can be located on the same surface of the transparent conductive layer 24 or the same surface of the substrate 22. The first electrodes 28 and the second electrodes 29 can also be located between the transparent conductive layer 24 and the substrate 22. The first electrodes 28 and the second electrodes 29 can also be located on different surfaces of the transparent conductive layer 24.

The first electrodes 28 and the second electrodes 29 can be made of electrically conductive materials such as metal or carbon nanotubes. In one embodiment, the two first electrodes 28 are located separately on opposite ends of the transparent conductive layer 24 along the X axis. The two second electrodes 29 are located separately on opposite ends of the transparent conductive layer 24 along the Y axis. The X axis is perpendicular to the Y axis. The first electrodes 28 and the second electrodes 29 each are a strip of silver layer.

The shielding layer 25, the transparent protective film 26, and the passivation layer 27 can be the same as the shielding layer 15, the transparent protective film 126, and the passivation layer 17 described above.

Referring to FIG. 7, in operation of the display device 50, a voltage is applied to the transparent conductive layer 24 through the first electrode 28 and the second electrode 29 to form an equipotential plane on the transparent conductive layer 24. Contact is made with the transparent protective film 26 corresponding to elements appearing on the display element 530 from a contact tool 570 such as a finger, or a stylus. In the illustration, the contact tool 570 is the user's finger.

Due to an electrical field of the user, a coupling capacitance forms between the user and the transparent conductive layer 24. For high frequency electrical current, the coupling capacitance is a conductor, and thus the contact tool 570 takes away a little current from the contact point. Current through the electrodes 28 and 29 cooperatively replaces the current lost at the contact point. The quantity of current supplied by each electrodes 28 and 29 is directly proportional to the distance from the contact point to the electrodes 28 and 29. The touch panel controller 540 calculates the proportion of the four supplied currents, thereby detecting coordinates of the contact point on the touch panel 200. Then, the touch panel controller 540 sends the coordinates of the contact point to the CPU 550. The CPU 550 receives and processed the coordinates into a command. Finally, the CPU 550 issues the command to the display element controller 560. The display element controller 560 controls the display of the display element 530 accordingly.

Figure 11:
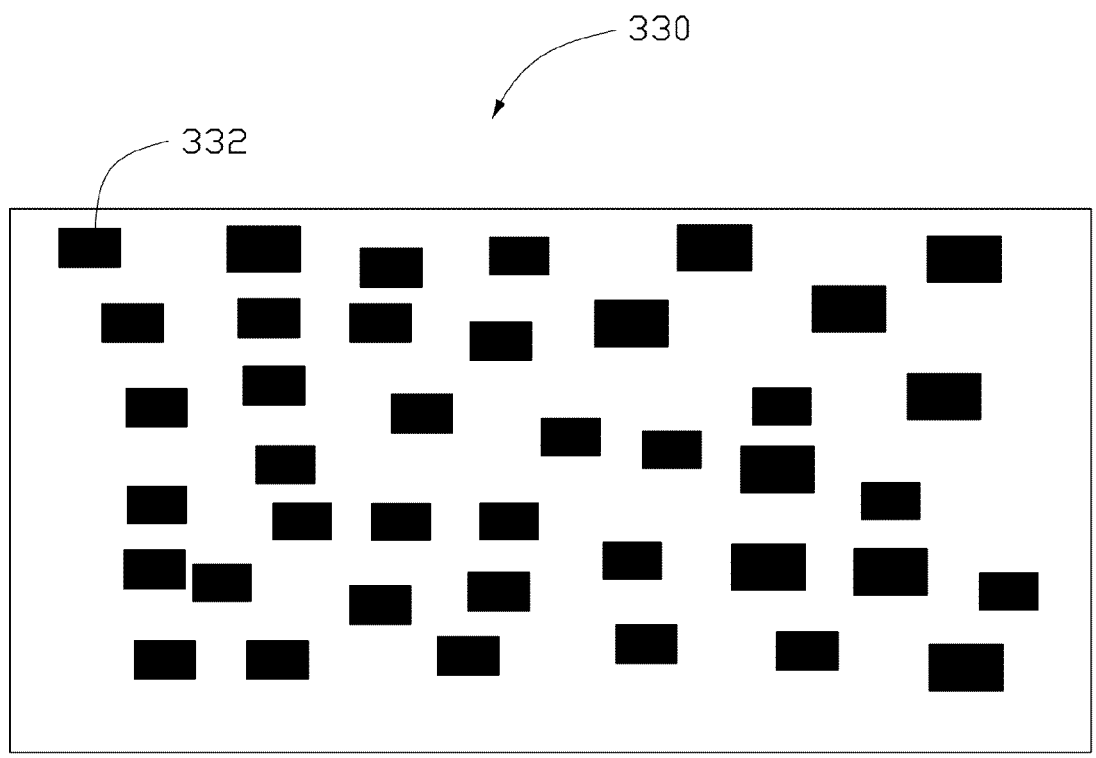
FIG. 11 is a schematic view of a carbon nanotube layer of another embodiment of a display device.

FIG. 11 shows a carbon nanotube layer of another embodiment of a display device. The carbon nanotube layer can be used in the resistive and capacitive touch panels described. The carbon nanotube layer is formed of a plurality of carbon nanotubes, and the carbon nanotubes in the carbon nanotube layer are arranged along the same axis (i.e. collinear and/or parallel).

The carbon nanotube layer comprises a plurality of thin regions. Each of the thin regions corresponds to at least one sub-pixel. The thin regions have the same density. The carbon nanotube layer is a non-periodical or non-iterative structure. The ratio of the density of the normal regions to the density of the thin regions exceeds 2:1. In one embodiment, the ratio of the density of the normal regions to the density of the thin regions exceeds 4:1. The densities of the carbon nanotube layer are non-periodically arranged.

In one embodiment, the thin regions can have different areas, and areas of the thin regions can be non-periodically arranged. In this situation, the thin regions can be non-periodically arranged in the carbon nanotube layer.

Referring to FIG. 11, in one embodiment, the carbon nanotube layer is a carbon nanotube film 330. The carbon nanotube film 330 comprises a plurality of thin regions 332. Each of the thin regions 332 corresponds to at least one sub-pixel. The areas of the thin regions 332 can be non-periodically or irregularly arranged. The thin regions 332 can have the same density. The thin regions 332 can be formed by irradiating a carbon nanotube film with laser beams. The ratio of the density of the normal regions to the density of the thin regions 332 exceeds 5:1.

The carbon nanotube film 330 can be used in resistive or capacitive touch panels in the same or similar manner to that described above. Because the carbon nanotube film 330 has irregular patterns due to the presence of the thin regions 332, moire patterns can be eliminated or reduced, promoting improved brightness of the touch panel and the display device using the same. Finally, the properties of the carbon nanotubes provide high mechanical strength and uniform conductivity to the carbon nanotube film 330. Thus, the touch panel and the display device using the same adopting the carbon nanotube film 330 are durable and highly conductive.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:
1. A display device comprising:
   a display element including a plurality of pixels each comprising a plurality of sub-pixels; and
   a touch panel comprising at least one transparent conductive carbon nanotube layer, wherein the at least one transparent conductive carbon nanotube layer comprises a plurality of thin regions and a plurality of normal regions, densities of the plurality of thin regions are less than densities of the plurality of normal regions, the plurality of thin regions correspond to the plurality of sub-pixels in a one-to-one manner, at least one of density and area of each of the plurality of thin regions is different from that of adjacent thin regions, and at least one of densities and areas of the plurality of thin regions are varied.

2. The display device of claim 1, wherein the plurality of thin regions are regularly distributed in the at least one transparent conductive carbon nanotube layer.

3. The display device of claim 1, wherein every adjacent two thin regions have different densities.

* * * * *